No. 763,993. PATENTED JULY 5, 1904.
V. W. MASON, Jr.
GEAR WHEEL.
APPLICATION FILED NOV. 24, 1902.
NO MODEL. 2 SHEETS—SHEET 1.

Witnesses:
H. B. Davis
Maud M. Piper

Inventor:
Volney W. Mason Jr.
by Amos & Harriman
Attys

No. 763,993. Patented July 5, 1904.

UNITED STATES PATENT OFFICE.

VOLNEY W. MASON, JR., OF NEW YORK, N. Y.

GEAR-WHEEL.

SPECIFICATION forming part of Letters Patent No. 763,993, dated July 5, 1904.

Application filed November 24, 1902. Serial No. 132,545. (No model.)

*To all whom it may concern:*

Be it known that I, VOLNEY W. MASON, Jr., of New York, in the county and State of New York, have invented an Improvement in Gear-Wheels, of which the following description, in connection with the accompanying drawings, is a specification, like characters on the drawings representing like parts.

This invention has for its object to improve and simplify the construction of wheels and rolls to the end that a detachable rim may be employed composed of manganese steel, which material, as is well known, is so difficult to work by machine as to be practically unmachineable; and the invention is particularly applicable to toothed wheels—as, for instance, spur and bevel gears.

The invention consists, essentially, in a rim having inwardly-extending ears provided with transverse recesses at their extremities and a hub having a plurality of pairs of outwardly-extended ears made as narrow as the spaces between the ears on the rim and having holes through them opposite said recesses and keys passing through said holes, which enter said recesses.

Figure 1:
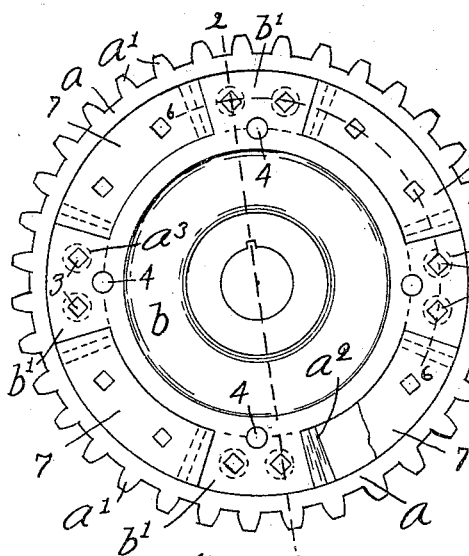
Figure 2:
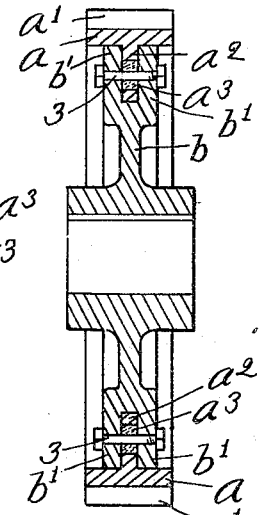
Figure 6:
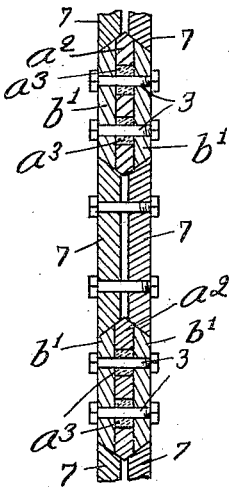
Figure 3:
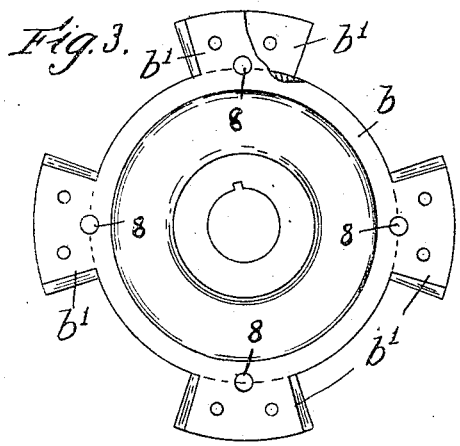
Figure 4:
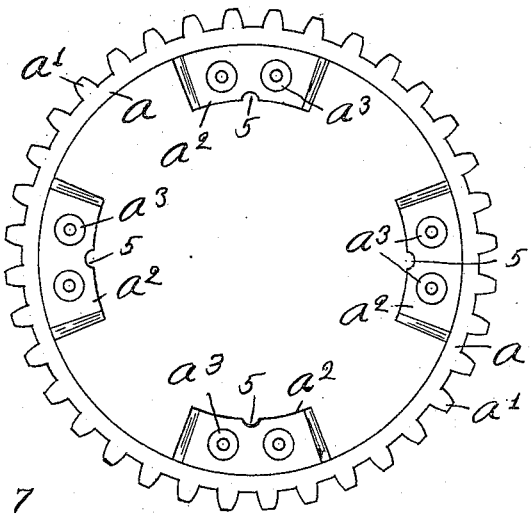
Figure 5:
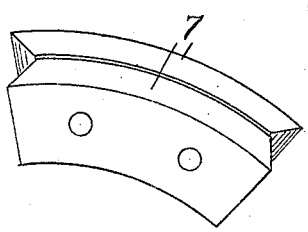

Figure 1 shows in side elevation a toothed wheel embodying this invention. Fig. 2 is a vertical section of the toothed wheel shown in Fig. 1, taken on the dotted line 2 2. Fig. 3 is a side elevation of the hub of the wheel, the rim being detached. Fig. 4 is a side elevation of the rim of the wheel, which is detached from the hub. Fig. 5 is a detail showing one of the retaining-blocks which may be employed for holding the parts in their relative positions. Fig. 6 is a sectional detail of a portion of the wheel, taken on the curved dotted line 6 6, Fig. 1; and Fig. 7 is a side elevation of a wheel embodying this invention which is devoid of teeth.

Figure 7:
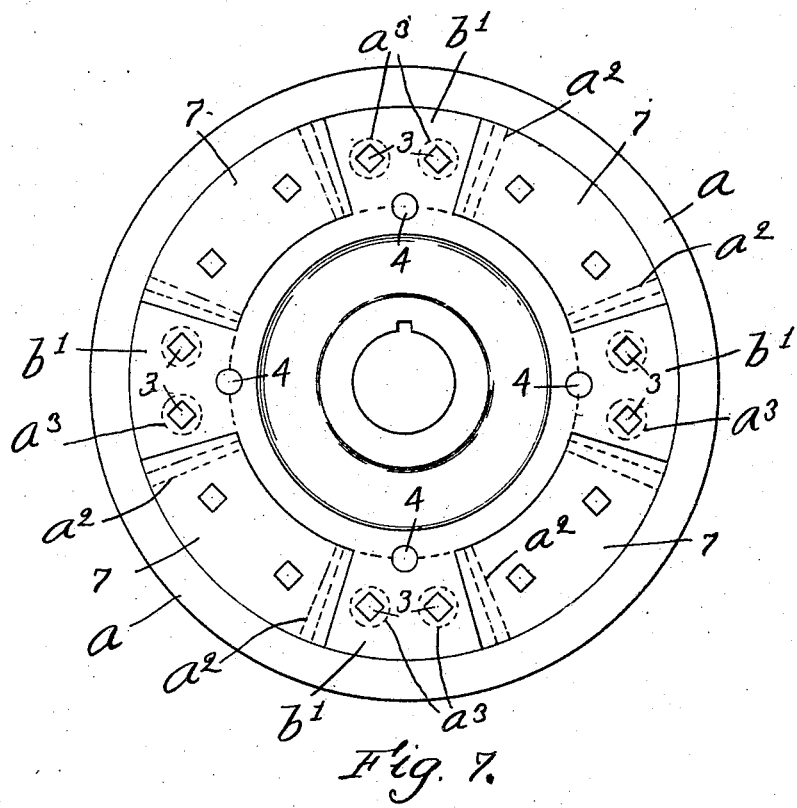

$a$ represents the rim of the wheel, which is made of manganese steel, and this rim in Figs. 1, 2, and 4 is shown as having teeth $a'$ of any suitable shape to produce a spur or bevel gear, whereas in Fig. 7 it is shown as devoid of teeth. On the inside of the rim $a$ a plurality of ears $a^2$ are formed, as many being employed as is deemed necessary, and said ears are made quite thin and as long as desired, and they are located substantially midway the width of the rim and preferably extend radially and are disposed with spaces between them, which spaces are at least as large as the ears on the hub. Ordinary machineable metal plugs $a^3$, which may be made of ordinary steel, are cast into the ears $a^2$, which are adapted to be drilled to provide holes for bolts 3, which serve as fastenings by which the rim is attached to the hub.

$b$ represents the hub of the wheel, which is made of any suitable material, and, as herein shown, it is formed with a plurality of pairs of ears $b'$ on its outer edge, which extend outward and preferably radially and which are made of any suitable length. There will be as many pairs of ears $b'$ provided as there are ears $a^2$ on the rim, and the ears of each pair $b'$ will be located far enough apart for the easy introduction between them of the ears $a^2$, and the several pairs of ears $b'$ will be separated sufficiently to provide ample space for the passage of the ears $a^2$, so that when the rim is placed on the hub said ears $a^2$ may be brought into correct position to be introduced between the ears $b'$ by turning said rim on its axis relative to the hub.

The ears $b'$ have bolt-holes for the bolts 3, and when the rim is placed upon the hub and turned on its axis so that its ears $a^2$ are brought into the spaces between the ears $b'$ of each pair the bolts 3 will be inserted, passing through the bolt-holes in the ears $b'$ and through the perforated plugs $a^3$ in the ears $a^2$. In lieu of bolts 3 keys 4 may be employed for securing the rim to the hub, or said keys may be provided in addition to the bolts, if desired. When the keys 4 are employed, each ear $a^2$ on the rim is formed with a keyway 5, and the hub $b$ is drilled at 8 at points opposite the keyways and keys or rivets driven through said holes 8 and keyways. These fastenings serve, essentially, to prevent the rim turning on its axis relatively to the hub, or either part turning relatively to the other.

In lieu of the bolts 2 and keys 4 other forms of fastenings may be provided—as, for instance, retaining-blocks 7 will be employed which can be placed in the spaces between the ears when the rim is placed on the hub, although said retaining-blocks may be used in addition to either or both of the other fastenings. The retaining-blocks 7 (see Fig. 5) are each composed of two plates, the ends of which are beveled on their adjacent faces, so that when said plates are secured together by bolts, rivets, or other suitable fastenings a V-shaped groove is provided at each end of the block, and the sides of the ears $b'$ $b'$ and $a^2$ are also formed V-shaped, adapting them to enter the V-shaped grooves in the block.

I do not desire to limit the shape of the grooves to V-shaped.

The block 7 is thus held in position and prevents the rim from turning on its axis relatively to the hub.

Having thus described my invention, what I claim as new, and desire to secure by Letters Patent, is—

1. A wheel consisting of a circular rim having a plurality of inwardly-extending ears having transverse recesses at their extremities, and a hub having a plurality of pairs of outwardly-extending ears made as narrow as the spaces between the ears on the rim and having holes through them opposite said recesses, and keys passing through said holes which enter said recesses, substantially as described.

2. A wheel consisting of a circular rim having a plurality of inwardly-extending ears having transverse recesses at their extremities and having bolt-holes, a hub having outwardly-extending ears made as narrow as the spaces between the ears on the rim and having holes opposite said transverse recesses, and holes opposite said bolt-holes, keys passing through said holes which enter said transverse recesses, and bolts passing through the bolt-holes, substantially as described.

In testimony whereof I have signed my name to this specification in the presence of two subscribing witnesses.

VOLNEY W. MASON, Jr.

Witnesses:
B. J. NOYES,
H. B. DAVIS.